June 19, 1962  L. R. DAFOE  3,039,820
VEHICLE SEAT
Filed Oct. 27, 1958  3 Sheets-Sheet 1

INVENTOR.
LESLIE R. DAFOE

ATTORNEYS

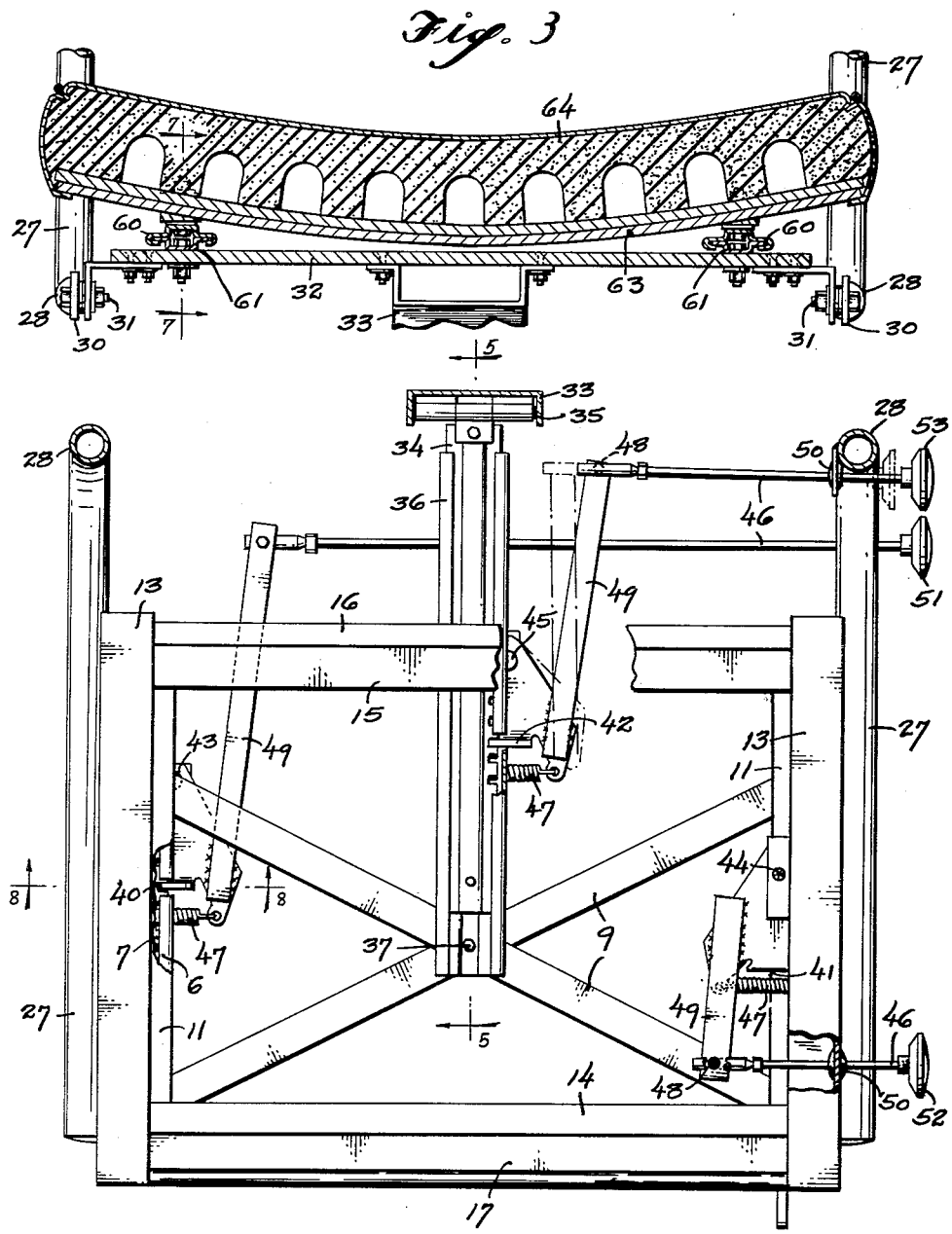

June 19, 1962  L. R. DAFOE  3,039,820
VEHICLE SEAT
Filed Oct. 27, 1958  3 Sheets-Sheet 3
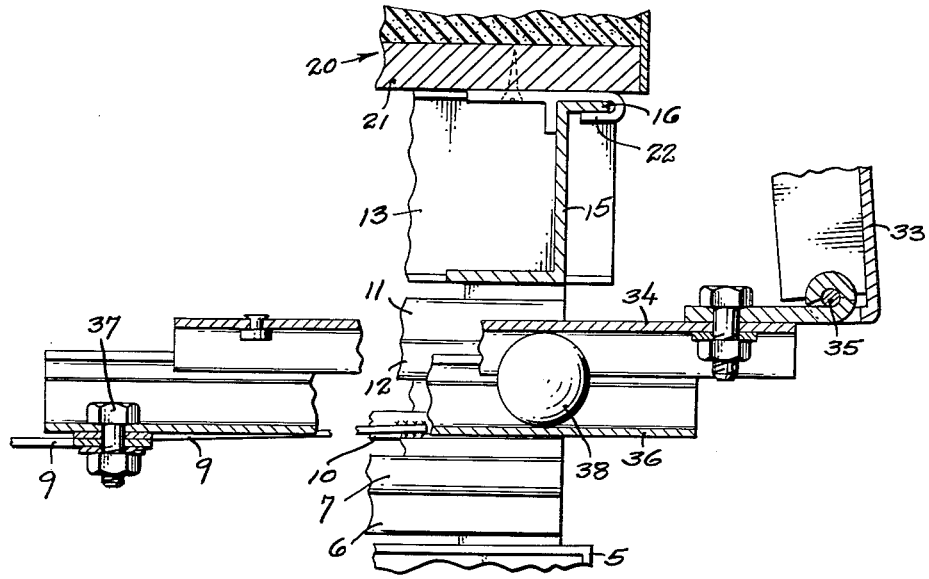
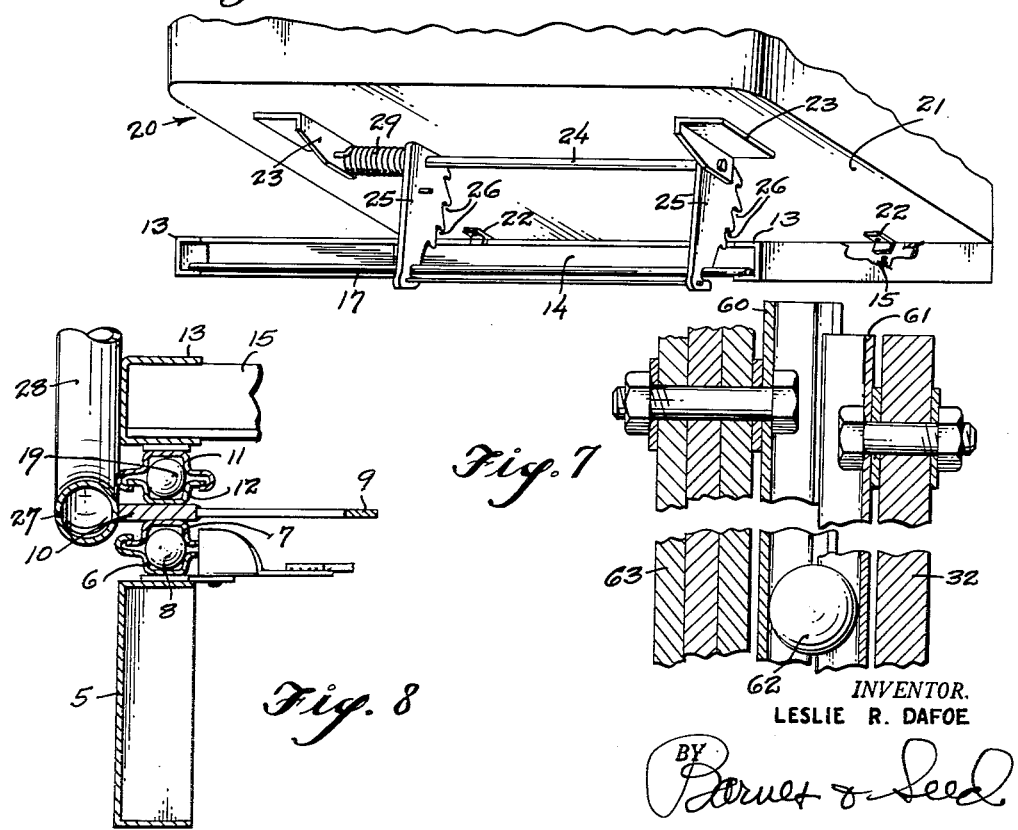
INVENTOR.
LESLIE R. DAFOE
ATTORNEYS 3,039,820
VEHICLE SEAT
Leslie R. Dafoe, Seattle, Wash., assignor to Pacific Car and Foundry Company, Seattle, Wash., a corporation of Washington
Filed Oct. 27, 1958, Ser. No. 769,859
9 Claims. (Cl. 297—308)

This invention relates to seats for automotive vehicles, particularly vehicles such as a truck having an individual seat or seats in the cab, each equipped with a resilient cushion characterized in that the seating surface admits to a considerable range of vertical motion as the cushion dampens irregularities in roads over which the vehicle is being driven. Seat-backs for vehicle seats of the above character are customarily stationary in point of vertical motion, and it thus develops that a considerable amount of tiring friction occurs as the back of an individual occupying the seat rubs against the seat-back. As its principal object the present invention aims to provide a vehicle seat having a seat-back which moves vertically in unison with the vertical movement of the seating surface of the seat cushion. The invention further aims to provide a vehicle seat of comparatively inexpensive construction incorporating the above feature in conjunction with adjusting means for shifting either the entire seat structure bodily or the seat cushion alone in a fore-and-aft direction, or tilting the back about a transverse horizontal axis.

These and other objects and advantages in view will appear and be understood in the course of the following description and claims, the invention consisting in the novel construction and in the adaptation and combination of parts hereinafter described and claimed.

In the accompanying drawings:

FIG. 3 is a fragmentary horizontal sectional view drawn to an enlarged scale on line 3—3 of FIG. 2.

FIG. 4 is a horizontal sectional view, with parts broken away, drawn to the same scale as FIG. 3 on line 4—4 of FIG. 2.

FIG. 5 is a fragmentary longitudinal vertical sectional view drawn to a yet larger scale on line 5—5 of FIG. 4.

FIG. 6 is a fragmentary perspective view of a front end portion of the vehicle seat, with the seat proper occupying the upper extreme of its permitted tilting adjustment.

Figure 1:
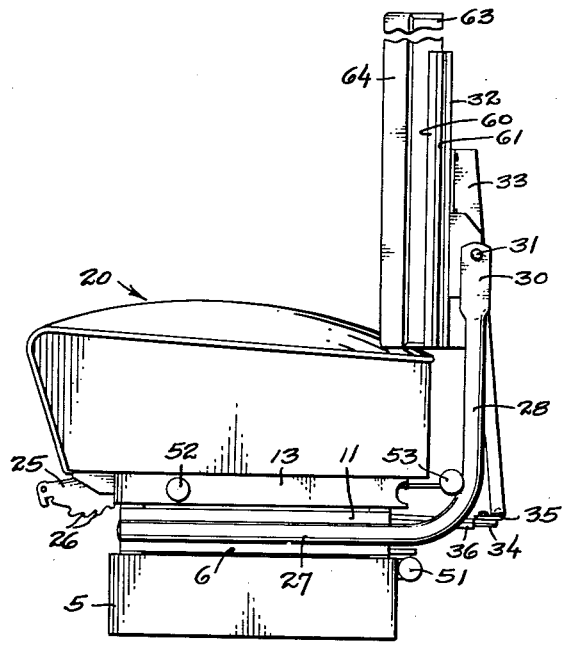
FIGURE 1 is a side elevational view portraying a vehicle seat constructed to embody the preferred teachings of the present invention.
Figure 2:
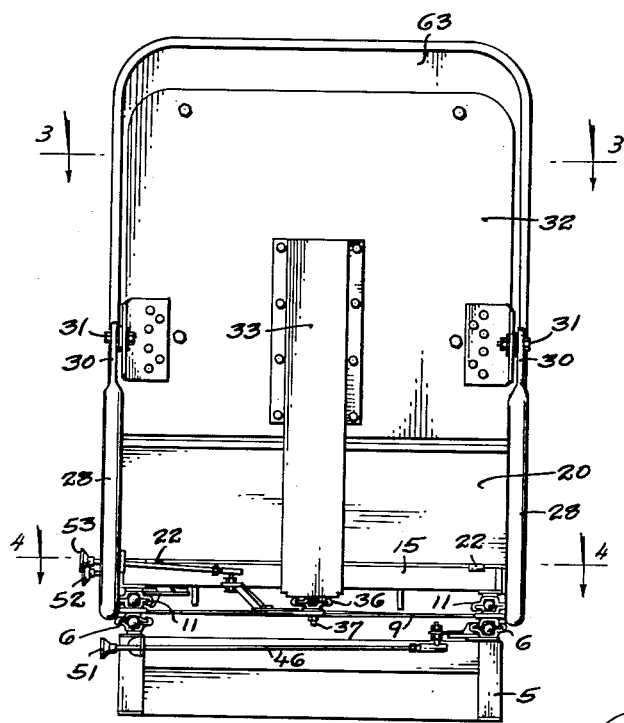
FIG. 2 is a rear elevational view thereof.

FIG. 7 is a fragmentary longitudinal vertical sectional view drawn to the same scale as FIG. 5 on line 7—7 of FIG. 3; and FIG. 8 is a fragmentary transverse vertical sectional view drawn on line 8—8 of FIG. 4 to a scale somewhat larger than that of FIGS. 3 and 4.

Referring to said drawings, the numeral 5 designates a mounting box arranged to be secured upon the floor of the driver's compartment of an automotive vehicle, and extending from front to rear at each of the two sides of this box is a respective one of two parallel surmounting rails 6 producing stationary slide-ways for complementing movable rails 7 which ride on captive balls 8. The two movable rails, one at each side, are each welded or otherwise secured to a respective overlying stringer 10. The two stringers are each rigidly connected by a pair of crossed braces 9, and with the rails 7 constitute a principal frame for the seat.

Overlying said principal seat frame is a subordinate seat frame comprised of side channels 13 connected fore-and-aft by Z-section cross-bars 14 and 15, respectively.

Such subordinate frames are sustained by rails 11 functioning as the sliding components of second slide assemblies which, like the slide-assemblies 6—7; each has its slide-way formed in a respective relatively stationary rail 12 and rides on captive balls 19. Said rails 12 rigidly surmount the stringers 10.

For purposes which will appear in course of describing the seat proper, the cross-bar 15 has a rearwardly directed horizontal flange 16 at the top, and the cross-bar 14 has a forwardly directed bulb-edged horizontal flange 17 at the bottom.

The cushion for the seat proper is designated generally by 20 and may be either spring or foam-rubber filled with a rigid base board 21. Clips 22 which engage said flange 16 are screwed to the underside of said base board at spaced intervals of the width along the back edge thereof, and at the front there is screwed to the underside a pair of spaced brackets 23 acting in complement to provide a journal mounting for a transverse rod 24. A pair of transversely spaced apart cam legs 25 are fixed to said rod so as to depend therefrom in a position to the front of said bulb-edge flange 17, and a torsion spring 29 yieldingly influences said legs toward said bulb-edge. Along their back edge, and which is to say the edge which faces the bulb-edge, said legs are serrated to provide a series of notches 26. By bringing said notches selectively into engagement with the bulb edge it will be apparent that the slope of the seat can be readily regulated and it will be seen that merely lifting the front edge of the seat causes automatic progression of said bulb edge from an inner to an outer notch in the series.

The principal seat frame includes a respective structural member for each of the two sides, preferably drawn from tubular stock and bent to an L-shape when viewed from the side. One branch 27 of these structural members is welded alongside a respective stringer 10 and positions the other branch 28 so that the same rises vertically at a point spaced somewhat to the rear of the subordinate frame's rear limit of slide travel. At their upper ends these riser branches are flattened, as at 30, and a back-board 32 is connected to these flats by pins 31 for pivot movement about a transverse horizontal axis. A centrally placed hanger 33 is secured to the back face of the back-board. The lower end of this hanger depends to approximately the level occupied by the stringer 10, and a rail 34 slidable horizontally in a fore-and-aft direction has its rear end hinged, as at 35, to such lower end. A stationary rail 36 which forms the slide-way complement for said sliding rail 34 is localized by a bolt 37 to the crossed braces 9 at the latter's point of juncture. As with the previously described slide assemblies, the slide assembly 34—36 has its sliding rail riding on captive balls 38.

Each of the sliding rails for said three slide assemblies provides a rack section within its length. A respective pawl, as 40, 41 and 42, is pivoted, as at 43, 44, and 45, for swing movement into and out of engagement with a selected notch of the rack teeth, and each of these pawls is retracted by a respective control rod 46 against the yielding influence of a respective spring 47. The control rods are movable transversely endwise to their axis and connect by universal joints 48 with lever arms 49 fixed to the pawls. Rubber grommets 50 provide slide journals for the rods, and hand-operated knobs, as 51, 52, and 53, are provided upon exposed ends of the rods.

From the foregoing it will be apparent that slide movement of the movable rails 7 shifts the entire seat assembly and the back-board bodily as a unit. Slide movement of the movable rails 11 shifts the subordinate frame relative to the principal frame. Slide movement of the movable rail 34 modifies the tilt of the back-board.

Reverting to said back-board, it will be seen that the same carries a fourth slide assembly upon its front face, similarly comprised of a movable rail 60 slidable relative to a stationary rail 61, with captive balls 62 being provided as a non-friction bearing. There are two of these last-named slide assemblies, each extending parallel to the back-board's longitudinal axis one adjacent one side edge and the other adjacent the other side edge of the board. The rigid backing plate 63 for a seat-back is secured to said movable rails 60, and as with the seat proper such seat-back provides a suitably upholstered foam rubber or spring-filled cushion 64. The placement of such seat-back is such that the same rests upon the seat proper, hence slides up and down automatically in concert with the vertical flexing action of the seat cushion. There is consequently no relative motion, such as to create tiring friction, between the seat occupant's back and the seat-back.

It is my intention that no limitations are to be implied and that the hereto annexed claims be given the broadest interpretation to which the employed language fairly admits.

What I claim is:

1. In a vehicle seat, a resilient seat cushion subjecting an occupant of the seating surface to shock-dampening vertical motion as the vehicle passes over road irregularities, and a seat-back for the seat cushion journaled for vertical slide movement in a rectilineal path and bearing upon a rear portion of said seating surface so as to move vertically in concert with the vertical motion of the seating surface, said seat-back being free of any attachment which inhibits the seat-back from rising independently of the seat cushion.

2. Structure according to claim 1 having a seat frame giving support to the seat cushion and to a frame-work providing a stationary component of the seat-back's slide journal.

3. In a vehicle seat, a foundation, and a seat and a seat-back receiving support from said foundation, the support given by said foundation to the seat-back being such as permits the seat-back to rise in a vertical direction along a rectilineal path independently of any lesser vertical rise of the seat so as to move freely in concert with an occupant of the seat whose back is pressing against said seat-back.

4. Structure according to claim 1, said seat cushion being mounted for tilting movement about its rear edge as an axis, and means for releasably setting the cushion at selected points within the range of its permitted tilting movement.

5. In a vehicle seat, a frame-work, a resilient seat cushion supported by said frame-work subjecting an occupant of the seating surface to shock-dampening vertical motion as the vehicle passes over road irregularities, and a seat-back for the seat cushion bearing by its bottom edge upon a rear portion of said surface so as normally to move vertically in concert with the vertical motion of said surface on which it bears and guidably supported by the frame-work so that said vertical motion occurs in an established path, said seat-back being free of any attachment which inhibits the seat-back from rising independently of the seat cushion.

6. In a vehicle seat, a frame-work, a resilient seat cushion supported by said frame-work subjecting an occupant of the seating surface to shock-dampening vertical motion as the vehicle passes over road irregularities, and a seat-back for the seat cushion bearing by its bottom edge upon a rear portion of said surface so as normally to move vertically in concert with the vertical motion of said surface on which it bears and guidably supported by the frame-work so that said vertical motion occurs in an established path, said seat cushion being mounted for tilting movement about its rear edge as an axis, and means for releasably setting the cushion at selected points within the range of its permitted tilting movement, said setting means comprising a pair of transversely spaced apart depending companion legs pivoted from the underside of the seat cushion's front end to swing in a fore-and-aft direction about a transverse horizontal axis, said legs being provided along their back edges with a like series of serrations producing notches arranged to selectively engage a transverse horizontal bar carried by the seat frame, and means including a spring yieldingly urging said legs to swing in unison in an aft direction.

7. In a vehicle seat, a resilient seat cushion subjecting an occupant of its seating surface to shock-dampening vertical motion as the vehicle passes over road irregularities, a seat frame giving support to said seat cushion and presenting a pair of upstanding arms lying to the immediate rear of the seat cushion at opposite sides of the longitudinal median line thereof, an upright back-board supported by said arms for pivotal movement about a transverse horizontal axis lying well above the level of said seating surface, a seat-back for the seat cushion lying to the front of the back-board and journaled thereto for slide movement in a transverse vertical plane, a horizontal connection adjustable as to length extending from the lower end of the pivoted back-board to the seat frame, and means for releasably fixing said connection at a selected one of the permissible adjustments, said connection between the back-board and the seat frame comprising a pair of rails one flexibly attached at the front end of the connection to the seat frame and the other hingedly attached at the rear end of the connection to said lower end of the back-board, said rails complementing one another in that the one provides a slide-way for the other, one of the rails having a rack formed along an edge thereof, the other rail, for said adjustment of the length of the connection, having a manually retractible spring-pressed pawl pivotally carried thereby for engagement between selected teeth of the rack.

8. Structure as recited in claim 7 in which the seat-back rests upon a rear portion of said seating surface so as to move vertically with the seating surface in response to shock-dampening movements of the seat cushion.

9. In a vehicle seat, a resilient seat cushion subjecting an occupant of its seating surface to shock-dampening vertical motion as the vehicle passes over road irregularities, a seat frame giving support to said seat cushion and presenting a pair of upstanding arms lying to the immediate rear of the seat cushion at opposite sides of the longitudinal median line thereof, an upright back-board supported by said arms for pivotal movement about a transverse horizontal axis lying well above the level of said seating surface, and a seat-back for the seat cushion lying to the front of the back-board and journaled thereto for rectilineal slide movement in a transverse vertical plane, the slide journal comprising a pair of rails one connected to the back-board and the other to the seat-back and complementing one another in that the one provides a confining slide-way for the other, and having captive balls between said rails producing a non-friction bearing therefor.

References Cited in the file of this patent

UNITED STATES PATENTS

| | | |
|---|---|---|
| 1,187,580 | Webb | June 20, 1916 |
| 1,423,460 | Schreiber | July 18, 1922 |
| 1,767,757 | Harris | June 24, 1930 |
| 2,009,024 | Salmons | July 23, 1935 |
| 2,366,730 | Hickman | Jan. 9, 1945 |
| 2,577,050 | Buren | Dec. 4, 1951 |
| 2,605,813 | Seitz | Aug. 5, 1952 |
| 2,725,921 | Markin | Dec. 6, 1955 |
| 2,795,265 | Albrecht | June 11, 1957 |
| 2,832,397 | Premo | Apr. 29, 1958 |
| 2,856,984 | Simons et al. | Oct. 21, 1958 |
| 2,859,063 | Underland | Nov. 4, 1958 |
| 2,925,120 | Flint | Feb. 16, 1960 |